United States Patent [19]

Doan

[11] 4,100,557
[45] Jul. 11, 1978

[54] VISOR OPTICAL CAMERA SYSTEM

[76] Inventor: Duc Doan, 7814 S. San Pedro St., Los Angeles, Calif. 90003

[21] Appl. No.: 796,128

[22] Filed: May 12, 1977

[51] Int. Cl.² .......................... G03B 13/08; A42C 5/00
[52] U.S. Cl. ..................................... 354/225; 2/185 R
[58] Field of Search ............................... 354/150–155, 354/224, 225; 350/301; 2/185 R

[56] References Cited

U.S. PATENT DOCUMENTS

| 736,418 | 8/1903 | Merrick | 2/185 R |
|---|---|---|---|
| 1,358,551 | 11/1920 | Hosford | 2/185 R |
| 2,165,512 | 7/1939 | Schofield | 354/225 |
| 2,252,640 | 8/1941 | Nüchterlein | 354/155 |
| 3,019,689 | 2/1962 | Paulsrud | 350/301 |
| 3,174,418 | 3/1965 | Faasch et al. | 354/151 X |
| 3,819,255 | 6/1974 | Matui | 354/155 |
| 3,827,788 | 8/1974 | Clark | 354/225 |
| 3,881,804 | 5/1975 | Ikeda | 354/224 |

Primary Examiner—Donald Griffin
Attorney, Agent, or Firm—Brown & Martin

[57] ABSTRACT

A visor optical camera viewing system for sighting a camera for taking candid photographs includes a visor mounted mirror utilized in combination with a vertically oriented viewing screen on a camera for permitting a photographer to hold the camera at waist level and sight the camera in any direction from side to side or ahead while having the head and eyes turned straight ahead. This arrangement permits the taking of candid photographs without the subject being aware of the taking of the picture.

5 Claims, 4 Drawing Figures

VISOR OPTICAL CAMERA SYSTEM

BACKGROUND OF THE INVENTION

The present invention relates to camera viewing systems and pertains particularly to a viewing lens system for remotely sighting a camera.

The taking of photographs of a subject with natural expressions is difficult to achieve. This is because the subject once he is aware of the photograph being taken becomes self-conscious and assumes a pose specifically for the camera. It is therefore necessary in order for most subjects to be photographed with a natural expression to be caught completely unaware. The prior art approach typically uses hidden cameras or a telephoto lens so that the photograph can be made from a distance without the subject being aware of it.

It is therefore desirable that some means be available for quickly and conveniently taking candid photos of nearby subjects.

SUMMARY AND OBJECTS OF THE INVENTION

Accordingly, it is the primary object of the present invention to overcome the above problems of the prior art. It is another object of the present invention to provide a optical viewing system for a camera which permits the surreptitious aiming and shooting of the camera at nearby subjects.

A further object of the present invention is to provide a convenient and inexpensive system for permitting a camera to be held at waist level and aimed and shot at nearby subjects while the cameraman is looking in a direction which is different from which the camera is aimed.

In accordance with the primary aspect of the present invention, a visor optical camera viewing system includes a vertically oriented viewing screen for a camera to be held at waist level and a visor mirror mounted above the screen at approximately eye level of a viewer for sighting the camera.

BRIEF DESCRIPTION OF THE DRAWINGS

The above and other objects and advantages of the present invention will become apparent from the following description when read in conjunction with the drawings, wherein.

DETAILED DESCRIPTION OF PREFERRED EMBODIMENTS

Figure 1:
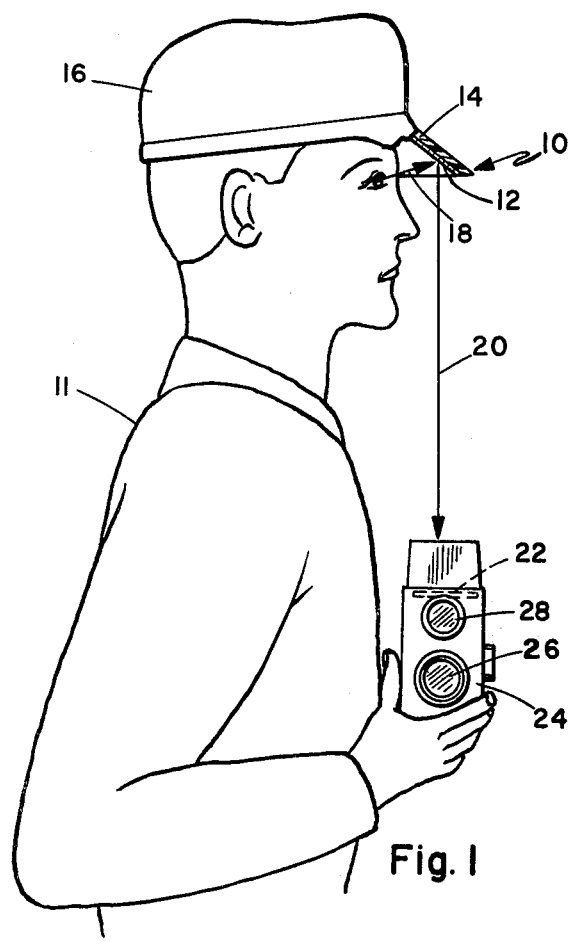
FIG. 1 illustrates the visor optical system in use.
Figure 2:
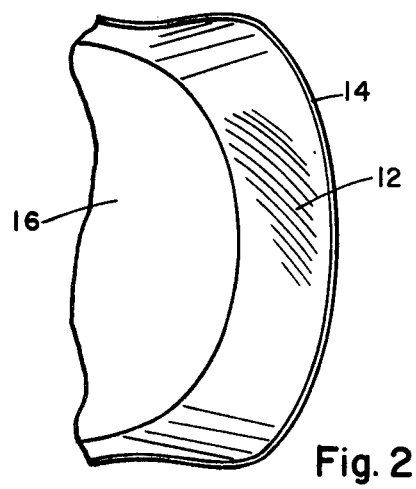
FIG. 2 is an underside view of the visor and mirror.

Turning now to FIG. 1 of the drawing, there is illustrated a viewing system in accordance with the invention designated generally by the numeral 10 in use by a cameraman 11. The viewing system comprises a visor mirror 12 suitably mounted on any suitable support means such as a strap, a hat or by means of a cap 16, as illustrated, to the head of the cameraman 11. The mirror 12 is mounted and positioned to permit the cameraman to look substantially straight ahead and slightly upward and view along a line of vision designated by arrows or lines 18 and 20 to a screen 22 which is vertically oriented on top of the camera 24. The camera 24 may be described as remotely located since it is out of the cameraman's direct line of signt. A double reflex camera 24 is illustrated with the camera pointed with the lens 26 thereof directed to the cameraman's right. This permits the cameraman 11 to look straight ahead and take pictures by aiming or sighting the camera 24 to either side or more specifically, in any direction 90° to either side of the direction he is facing.

This permits the cameraman to take photographs of persons without them being aware of it and permits the obtaining of candid photographs wherein the subject is acting normally.

Figure 3:
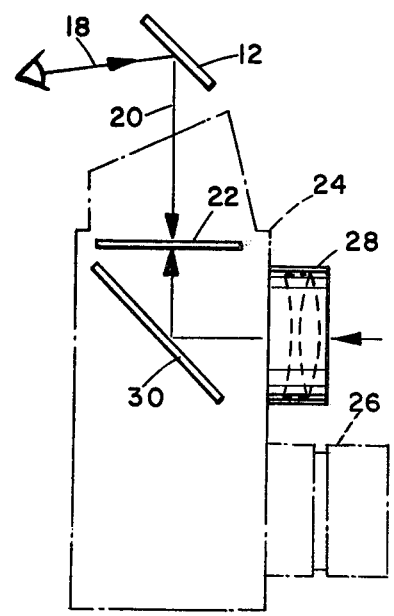
FIG. 3 is a diagram of the optical system as applied to a twin lens reflex camera.

The schematic illustration in FIG. 3 best illustrates the viewing system. As seen, the view from the eye of the observer or the sighting cameraman is to the mirror 12 which is aligned to view the screen 22 which is lined in a horizontal plane and oriented vertically. The screen 22 shows the image seen through viewing lens 28 on the camera. The image through the viewing lens 28 is reflected by a directing mirror 30 inside the camera onto the screen 22. The screen 22 is a suitable ground glass or the like which shows or forms the image directed thereon. The camera lens 26 is in alignment with the viewing lens 28 to take photographs of an object in sight of the viewing lens.

The usual manner of taking pictures with a double reflex camera of this sort is to face the subject, whose photograph is to be taken, point the camera in the general direction thereof and look down at the screen 22, moving the camera to center the image on the screen. Such action catches the attention of the subject of the photograph and prevents the subject from acting naturally. With the present arrangement, the subject, although close by, is not aware that the photograph is being taken.

Figure 4:
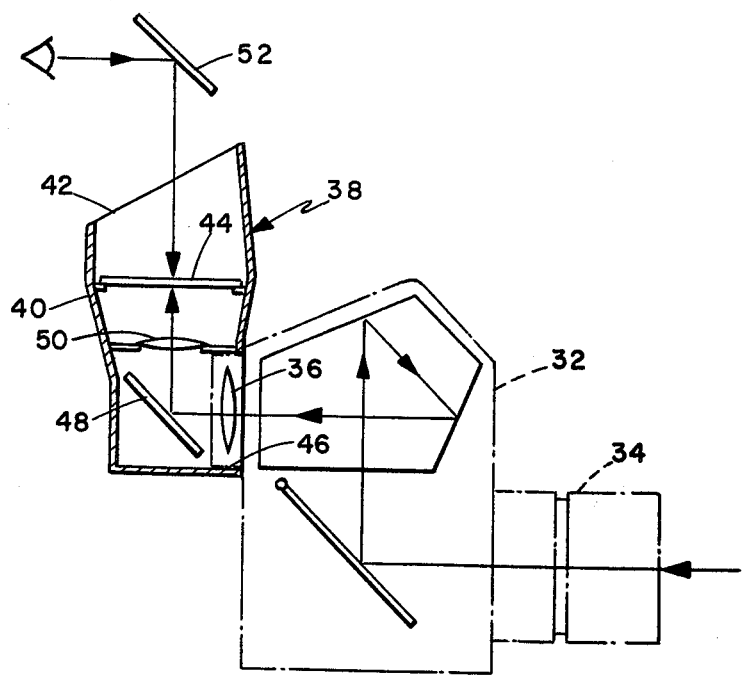
FIG. 4 is a diagram of the optical system with an adaptor attached to a single lens reflex camera.

Turning now to FIG. 4, there is illustrated a single lens reflex camera and a viewing screen adapter therefore. With the single lens reflex camera, the viewing lens is coincident with the camera picture taking lens and the sighting of the object to be photographed is through the lens. The eye piece is arranged to such that the sight is directed through the camera lens. In FIG. 4, shown in phantom, is a camera 32 having a lens 34 and an eye piece 36 through which the camera is sighted for taking the picture of an object (not shown). With such a camera, the camera is held up to the eye with the eyepiece toward the object of the picture. Such cameras and manipulation of the camera is quite conspicuous and readily apparent to the object of the photograph.

An adapter shown generally by the numeral 38 comprises a housing 40 having an opening in the top thereof 42 and a screen 44 mounted therein in a horizontal position with the screen directed vertically. The housing includes a further opening 46 which fits over the eyepiece of the camera for alignment therewith. An image reflected through the camera exits at the eyepiece, enters through lens 36 and is reflected by way of a directing mirror 48 through a correcting lens 50 onto the viewing screen 44. The housing projects upward above the surface of the screen 44 to provide a light shield to enhance the visibility of the object on the screen. With this arrangement, as in the previous embodiment, the eye of the cameraman is directed through a mirror 52 mounted in front of his eyes, and which is adjusted such that he can see the screen 44. Thus, with the present system, photographs can be taken of objects without the object thereof being aware that his photograph is being taken.

While the present invention has been illustrated and described by means of specific embodiments, it is to be understood that numerous changes and modifications may be made therein without departing from the spirit and scope of the invention as defined in the appended claims.

Having described my invention, I now claim:

1. A visor optical system for sighting a remotely located camera comprising:
   a camera having a vertically oriented viewing screen disposed below eye level of an individual holding the camera, and
   a visor mirror supported substantially at eye level and oriented for viewing the camera viewing screen when looking straight ahead so that said camera can be aimed and shot by an individual in directions other than in which the individual is apparently looking.

2. The viewing system of claim 1, wherein said visor mirror comprises a visor of a cap for resting on an individuals head, and
   a plane mirror mounted on the underside of said visor.

3. The viewing system of claim 1, wherein said viewing screen comprises an adapter for a single lens reflex camera.

4. The viewing system of claim 2, wherein said viewing screen comprises an adapter for a single lens reflex camera,
   said adapter comprises a housing having a vertically directed opening,
   said viewing screen is mounted in said opening,
   a horizontally directed opening in said housing for covering the eyepiece of a camera when mounted thereon, and
   a directing mirror for directing an image from said eyepiece to said viewing screen.

5. The viewing system of claim 2, wherein said viewing screen is the viewing screen of a twin lens reflex camera.

* * * * *